United States Patent [19]

Steele

[11] Patent Number: 4,953,587

[45] Date of Patent: Sep. 4, 1990

[54] BALL VALVES FOR PIPELINES

[75] Inventor: John Steele, Dunfermline, United Kingdom

[73] Assignee: T K Valve Limited, United Kingdom

[21] Appl. No.: 460,865

[22] PCT Filed: Aug. 10, 1988

[86] PCT No.: PCT/GB88/00660

§ 371 Date: Feb. 9, 1990

§ 102(e) Date: Feb. 9, 1990

[87] PCT Pub. No.: WO89/01583

PCT Pub. Date: Feb. 23, 1989

[51] Int. Cl.$^5$ .................. F16K 43/00; F16K 5/06; F16K 25/00

[52] U.S. Cl. .................. 137/315; 137/454.6; 251/174; 251/315; 251/316; 251/317

[58] Field of Search .............. 137/72, 315, 454.2, 137/454.5, 454.6; 251/162, 174, 176, 315, 316, 317

[56] References Cited

U.S. PATENT DOCUMENTS

| | | | |
|---|---|---|---|
| 3,150,681 | 9/1964 | Hansen et al. | 137/315 |
| 3,179,121 | 4/1965 | Bredtschneider | 137/454.6 |
| 3,211,421 | 10/1965 | Johnson, Jr. et al. | 251/315 |
| 3,576,309 | 4/1971 | Zawacki et al. | 251/174 |
| 3,838,844 | 10/1974 | Arn | 251/174 |
| 3,920,036 | 11/1975 | Westenrieder | 137/315 |
| 4,460,012 | 7/1984 | Koumi et al. | 137/315 |
| 4,562,860 | 1/1986 | Walter et al. | 137/454.6 |
| 4,580,762 | 4/1986 | Hirtz et al. | 251/174 |
| 4,606,368 | 8/1986 | McCafferty | 137/315 |

FOREIGN PATENT DOCUMENTS 0132989 2/1985 European Pat. Off. .
0133755 3/1985 European Pat. Off. .
2568657 2/1986 France .

Primary Examiner—George L. Walton
Attorney, Agent, or Firm—Mason, Fenwick & Lawrence

[57] ABSTRACT

A ball valve is provided in which an outer housing (1) can be left in a pipeline during servicing and a sub-assembly can be removed as a unit from the top of the outer housing (1). The sub-assembly comprises an inner housing (8) in which a ball member 17 is journalled for rotation, and annular seal adaptors (13) for interposition between the ball member (17) and diametrically opposite openings (3) in the outer housing (1). The seal adaptors (13) are such that they can be easily withdrawn outwardly from the withdrawn sub-assembly to reveal the ball member 17 and the seal adaptors for inspection without having to remove the ball (17) itself. The seal adaptors (13) are also wedged-shaped so that when the sub-assembly is refitted in the outer housing (1), the seal adaptors (13) automatically come into sealing engagement with the ball member (17) and the outer housing (1).

2 Claims, 3 Drawing Sheets

BALL VALVES FOR PIPELINES

This invention relates to a ball valve or pipelines.

A ball valve has been disclosed in U.S. Pat. No. US-A-4580762 comprising an outer housing in the form of a substantially cylindrical pot open at one axial end and closed at the opposite axial end and having two diametrically opposing openings in a wall of the housing, the outer sides of the openings being adapted for connecting the housing into a pipeline and flat annular seat faces being formed around the openings at the inner sides thereof, an annular wedge-shaped ring located against each one of said seat faces with the shallowest dimension of the ring nearest the open end of the outer housing, an inner housing having two opposing openings in a wall of the inner housing, flat annular seats being formed around the openings at the outer sides thereof, two annular wedge-shaped adaptors each having an annular shoulder located against the respective seats on the inner housing, an inclined annular surface on the outer side of each adaptor with the deepest dimension of each adaptor nearest the open end of the outer housing, a ball member mounted for rotation within the inner housing, the ball member having a diametrical through passage and a rotatable operating stem journalled in a removable closure bonnet, the inner housing, the adaptors, the ball member and operating stem being insertable into and withdrawable as a subassembly from the outer housing through its open end, the subassembly being insertable into the outer housing to a fully assembled condition therewith where the inclined annular surface of each adaptor is wedgingly engaged with one of said annular wedge-shaped rings and the ball member being rotatable between an open position where its through passage is aligned with the adaptors and a closed position where the openings are blocked by the ball member.

The ball valve of the present invention is characterised in that the inner housing is also in the form of a substantially cylindrical pot open at one axial end and closed at the opposite axial end, the two opposing openings in the wall of the inner housing also diametrically opposing each other, the ball member being rotatable about the axis of the inner housing and being installable into the inner housing through the open end thereof, and the removable bonnet closing the inner housing which in turn closes and is rigidly secured within and to the outer housing, and in that each adaptor also has a cylindrical neck projecting through the associated opening in the inner housing, the neck housing annular seal means resiliently engaging the ball member.

In the earlier disclosed ball valve the inner housing is spring-urged within the outer housing so that the wedging engagement between the adaptors and the annular wedge-shaped rings produces a very tight engagement between the adaptors and the ball member to such an extent that it is necessary to release the wedging engagement against the spring-urging before the ball member can be rotated. In the present invention the resilient engagement of the annular seal means with the ball member provides ample sealing while permitting rotation of the ball member. Furthermore, in the earlier disclosed ball valve the inner housing is assembled and dismantled with the ball member housed therein. In the present invention the ball member can be removed from installed in the inner housing through the open end thereof. The valve of the invention also complies with BSI and API requirements. In firesafe applications the invention may embody the sealing arrangements disclosed in European (U.K.) Patent Specification No. 0027048 and complies with BS No. 5146 firesafe requirements and equivalent API firesafe requirements An embodiment of the invention will now be described, by way of example, with reference to the accompanying drawing, in which:

Figure 1:
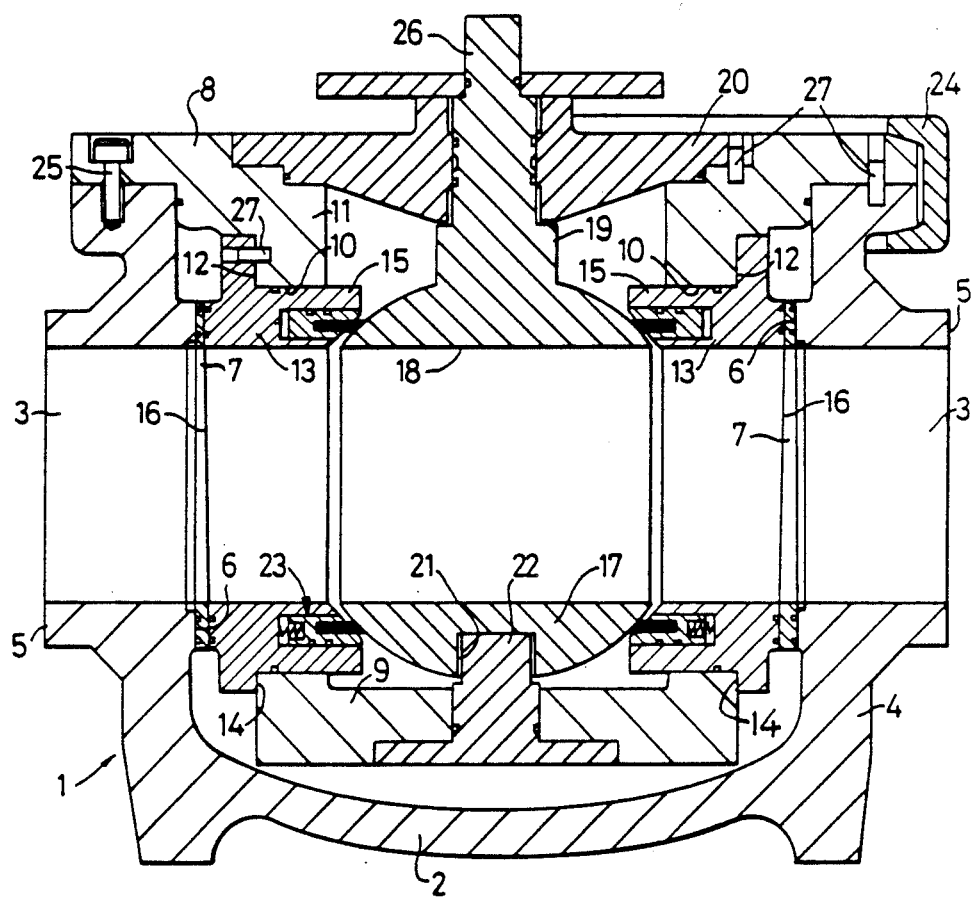
FIG. 1 is an axial sectional view of a fully assembled valve embodying the invention.

The ball valve comprises an outer housing 1 in the form of a substantially cylindrical pot closed at one axial end by a bottom wall 2 and open at the other axial end at the top. The housing 1 has two diametrically opposite openings 3 in the cylindrical wall 4 of the housing 1 and the radially outer sides 5 are adapted for connecting the housing into a pipeline. Around the openings 3 at the radially inner sides thereof there are formed flat annular seat faces 6 against each of which there is located an annular wedge-shaped ring 7 with the deepest dimension nearest the wall 2.

Figure 3A:
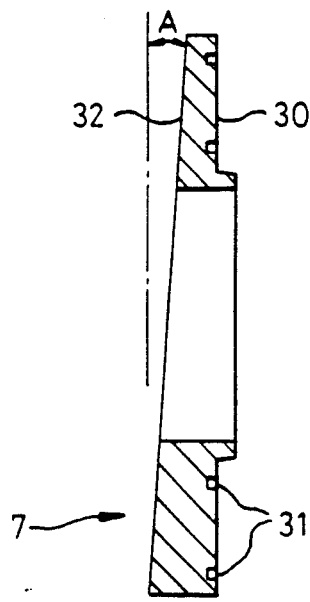
FIG. 3a and 3b are respectively a sectional side view and an end view of an annular wedge-shaped ring used in the valve.
Figure 3B:
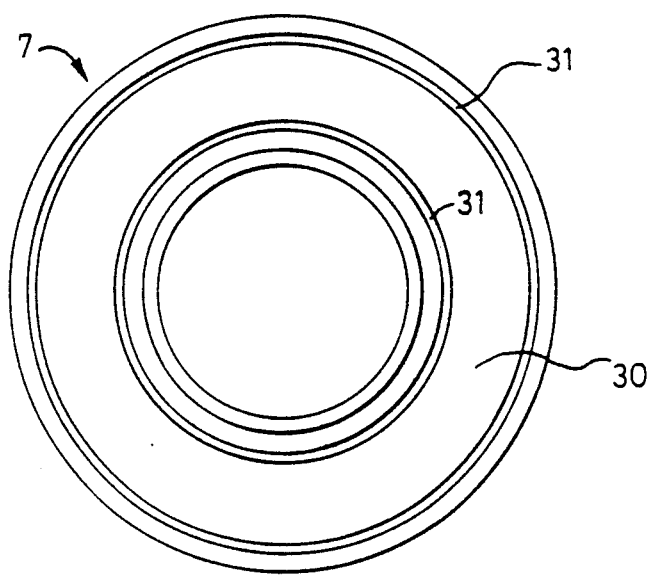

One of the rings 7 is shown in greater detail in FIG. 3. The ring 7 is formed with a face 30 for engagement with the seat face 6, the face 30 being provided with axial grooves 31 for receipt of O-rings (not shown). The opposed face 32 is angled to provide a wedge angle A of a few degrees.

Reverting to FIG. 1, a subassembly comprises an inner housing 8 in the form of a substantially cylindrical pot closed at one axial end by a bottom wall 9 and open at the other axial end at the top. The housing 8 has two diametrically opposite openings 10 in the cylindrical wall 11 of the housing 8. Flat annular seats 12 are formed around the openings 10 at the radially outer sides thereof and an annular wedge-shaped adaptor 13 has an annular shoulder 14 located against each one of the seats 12. A cylindrical neck 15 of the adaptor 13 projects through each opening 10 radially inwardly. Remote from the neck 15 the adaptor 13 has an inclined annular surface 16 and the shallowest dimension of the adaptor 13 is nearest the wall 9.

The subassembly also comprises a ball member 17 mounted for rotation within and about the axis of the housing 8. The ball member 17 has a diametrical through passage 18 and a rotatable operating stem 19 journalled in a removable bonnet 20 closing the top of the housing 8. Opposite the stem 19 the ball member 17 has a recess 21 rotatably receiving a trunnion 22 projecting upwardly from the wall 9. The ball member 17 is resiliently engaged by annular seal means 23 housed in the projecting cylindrical neck 15 of each adaptor 13.

Figure 2:
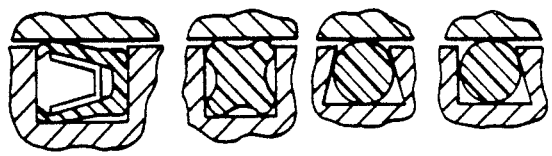
FIG. 2 shows a detail of FIG. 1 to an enlarged scale.
Figure 2:
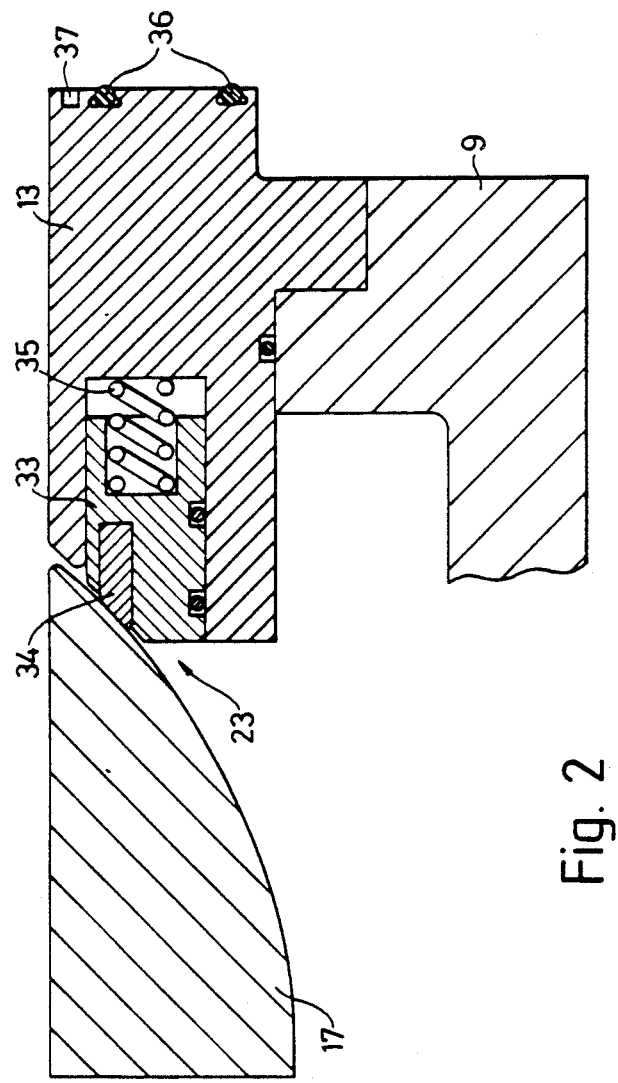

FIG. 2 shows part of the adaptor 13 in greater detail. The seal means 23 comprises a seal holder 33 carrying a seal 34 biased into engagement with the ball member 17, eg. by springs such as 35. The opposite face of the adaptor 13 is grooved to mount annular seals 36, and to provide an annular groove 37 in which a graphite seal (not shown) may be mounted for providing sealing in the event of fire. Various alternative forms for the seals 36 are illustrated to an enlarged scale in the margin of FIG. 2.

The subassembly is insertable into and withdrawable from the housing 1 through its open top, the subassembly being insertable into the housing 1 to a fully assembled condition therewith where the inclined annular surface 16 of each adaptor 13 is wedgingly engaged with a respective annular wedge-shaped ring 7. The ball member 17 is rotatable between an open position (as shown) where its through passage 18 is aligned with the aligned openings 3 and the openings through the adaptors 13, and a closed position where the openings are blocked by the ball member 17.

During servicing the housing 1 can be left connected in the pipeline and the subassembly withdrawn upwards. In this condition the rings 7 are easily accessible for replacement. Once the subassembly is withdrawn from the housing 1 the ball member 17 and the annular seals 23 are easily inspected since it is only necessary to withdraw outwardly the adaptors 13 and there is no need to remove the ball member 17.

The securing of the inner housing 8 within and to the outer housing 1 may be achieved in various ways. Where the open tops of both housings are flanged a quick-release manacle clamp 24 may be used.

Alternatively, the flanges may be bolted together as at 25. The stem 19 may be adapted at its top end 26 for various modes of actuation and the seals 23 may be biased towards the ball member 17 by springs and/or bypassed portions of the pressurised medium in the pipeline. It will also be noted that the subassembly can be pressure-tested while it is separate from the housing 1. Locating dowels are shown at 27.

I claim:

1. A ball valve comprising an outer housing (1) in the form of a substantially cylindrical pot open at one axial end and closed at the opposite axial end and having two diametrically opposing openings (3) in a wall (4) of the housing (1), the outer sides (5) of the openings (3) being adapted for connecting the housing (1) into a pipeline and flat annular seat faces (6) being formed around the openings (3) at the inner sides thereof, an annular wedge-shaped ring (7) located against each one of said seat faces (6) with the shallowest dimension of the ring (7) nearest the open end of the outer housing (1), an inner housing (8) having two opposing openings (10) in a wall (11) of the inner housing (8), with radial flat annular seats (12) being formed around the openings (10) at the outer sides thereof, two annular wedge-shaped shaped adaptors (13) each having a radial annular shoulder (14) located against the respective seats (12) on the inner housing (8), an inclined annular surface (16) on the outer side of each adaptor (13) with the deepest dimension of each adaptor (13) nearest the open end of the outer housing (1), a ball member (17) mounted for rotation within the inner housing (8), the ball member (17) having a diametrical through passage (18) and a rotatable operating stem (19) journalled in a removable closure bonnet (20), the inner housing (8), the adaptors (13), the ball member (17) and operating stem 19 being insertable into and withdrawable as a single subassembly from the outer housing (1) through its open end, and to reveal the ball member (17) and the seal adaptors (13) for inspection without having to removably detach the ball member (17) itself when the subassembly is withdrawn from the outer housing (1), the subassembly being insertable into the outer housing (1) to a fully assembled condition therewith where the inclined annular surface (16) of each adaptor (13) is wedgingly engaged with one of said annular wedge-shaped rings (7) for automatically causing a sealing engagement between the ball member (17) and the outer housing (1), and the ball member (17) is rotatable between an open position where its through passage (18) is aligned with the aligned openings in the outer housing (1) and the adaptors (13) and a closed position where the openings are blocked by the ball member (17), characterised in that the inner housing (8) is also in the form of a substantially cylindrical pot open at one axial end and closed at the opposite axial end, the two opposing openings (10) in the wall (11) of the inner housing (8) also diametrically opposing each other, the ball member (17) being rotatable about the axis of the inner housing (8) and being installable into the inner housing (8) through the open end thereof, and the removable bonnet (20) closing the inner housing (8) which in turn closes and is rigidly secured within and to the outer housing (1), and in that each adaptor (13) also has a cylindrical neck (15) projecting through the associated opening (10) in the inner housing (8), the neck (13) housing annular seal means (23) resiliently engaging the ball member (17).

2. A ball valve according to claim 1, characterised in that opposite the stem (19) the ball member (17) has a recess (21) rotatably receiving a trunnion (22) projecting from the closed end (9) of the inner housing (8).

* * * * *

UNITED STATES PATENT AND TRADEMARK OFFICE
CERTIFICATE OF CORRECTION

PATENT NO. : 4,953,587

DATED : September 4, 1990

INVENTOR(S) : John Steele

It is certified that error appears in the above-identified patent and that said Letters Patent is hereby corrected as shown below:

On the title page:

Following "PCT Pub. Date: Feb. 23, 1989",
add the following lines:
 --Foreign Application Priority Data
Aug. 11, 1987 [UK] United Kingdom ...... 8918959--

Signed and Sealed this

Sixteenth Day of June, 1992

Attest:

DOUGLAS B. COMER

*Attesting Officer*     Acting Commissioner of Patents and Trademarks